April 5, 1960 — J. C. TRAVILLA — 2,931,318
RAILWAY VEHICLE TRUCK
Filed Aug. 10, 1956 — 2 Sheets-Sheet 1
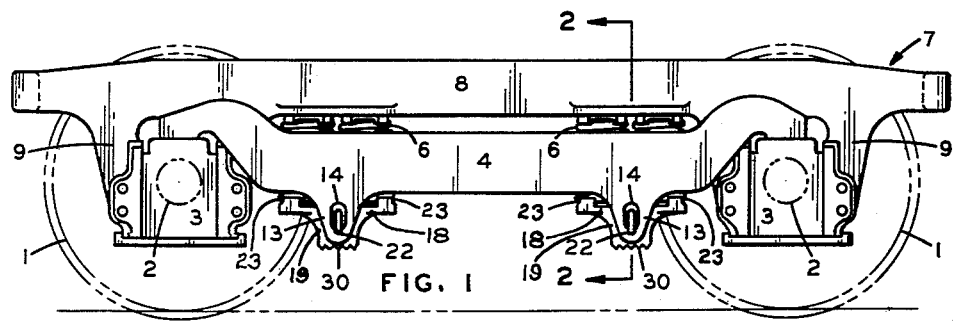
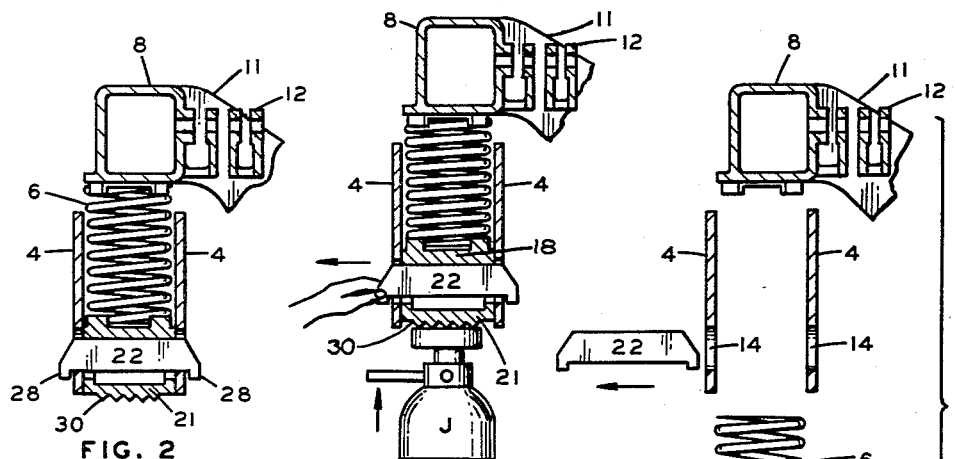
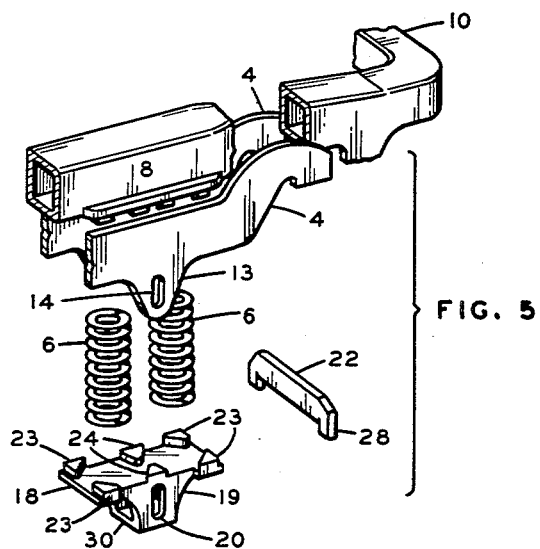
INVENTOR.
JAMES C. TRAVILLA
BY Francis T. Burgess
ATTORNEY April 5, 1960  J. C. TRAVILLA  2,931,318
RAILWAY VEHICLE TRUCK
Filed Aug. 10, 1956  2 Sheets-Sheet 2

INVENTOR.
JAMES C. TRAVILLA
BY Francis T. Burgess
ATTORNEY ated Apr. 5, 1960

2,931,318
RAILWAY VEHICLE TRUCK

James C. Travilla, Ladue, Mo., assignor to General Steel Castings Corporation, Granite City, Ill., a corporation of Delaware Application August 10, 1956, Serial No. 603,386

11 Claims. (Cl. 105—194)

The invention relates to railway vehicle trucks of the type in which the frame is spring-supported on equalizers and more particularly to the arrangement and construction of the equalizers and equalizer spring seats.

In the most usual type of equalized trucks, the journal boxes are vertically slidably received in spaced pedestals depending from the longitudinally extending side portions, or wheel pieces, of a unitary truck frame. Opposite ends of the equalizers rest on the tops of the journal boxes, which are normally slightly lower than the bottom of the wheel piece, and the intermediate portion of the equalizers is depressed to provide vertical space for the frame-supporting coil springs between the top of the equalizer and the bottom of the wheel piece, which in cast steel trucks is usually of box section. Usually these springs are supported on seats resting on and secured to the upper surface of the equalizer bars, although frequently, where double equalizers are used, the seats are recessed between the transversely spaced pair of equalizers. In most conventional equalized trucks, removal and replacement of equalizer springs involves a complex and expensive operation including dropping the wheel and axle assemblies, and equalizers, removing and replacing the spring or springs, and reassembling the truck. This operation is, of course increasingly complicated in the case of electric motor trucks, in which the motor housing is journalled on the axle and its nose is resiliently supported on the frame. The conventional drop equalizer has the further disadvantages that it makes impossible easy access to the brake shoes since they are normally positioned inboard of and in transverse alignment with the equalizer springs. In the past this condition has been corrected by using straight or nearly straight equalizers, but because such equalizers do not provide any vertical spacing between the spring seat portions and the bottom of the wheel piece, it is necessary that the wheel pieces be formed with upwardly extending recesses at the spring locations to provide adequate vertical space for the springs. The resultant wheel piece structure is an inverted channel member, which of course, must be of heavier construction to provide equivalent strength to a box section member.

Accordingly it is a principal object of the invention to provide an equalizer and equalizer spring seat arrangement by means of which the equalizer springs can be easily, quickly, and inexpensively removed and replaced.

A further object is to provide structure for this purpose in which the only tool required is a jack.

A further object is to combine in a single truck structure the accessibility offered by a straight equalizer and the greater strength of the box section wheel piece normally used with drop equalizers.

I achieve these objects by providing shallow dropped double equalizers each formed with depending projections at the equalizer spring seat locations. The equalizer spring seat is formed with a vertical transverse slot adapted to be in registry with a similar slot in the projections depending from the equalizers, so that it may be held in place by a key or gib passing through the registering slots. For preventing excessive tilting of the spring seat longitudinally of the truck, bosses adapted to engage the lower surfaces of the equalizers are formed on the four corners of the seat. With this arrangement, the springs can be easily removed by blocking up the frame at normal height, jacking up the seat until the deepest portions of the gib are in registry with the slots, removing the gib and lowering the jack and spring seat. This operation, in addition to its obvious simplicity, also affords great safety to personnel, since the equalizers shield personnel from the springs during the entire operation.

The foregoing objects and other detailed objects as will be apparent from the following description are attained by the structure illustrated in the accompanying drawings in which:

Figure 1 is a side view of a truck embodying the invention.

Figure 2 is a transverse vertical sectional view along the line 2—2 of Figure 1, showing the spring seat in its normal position.

Figure 3 is a view corresponding to Figure 2 but showing the spring seat jacked up preparatory to removal.

Figure 4 is a transverse sectional view corresponding to Figure 2 but showing the structure completely disassembled.

Figure 5 is an exploded perspective view of a portion of the truck illustrated in Figures 1–4.

Figure 6:
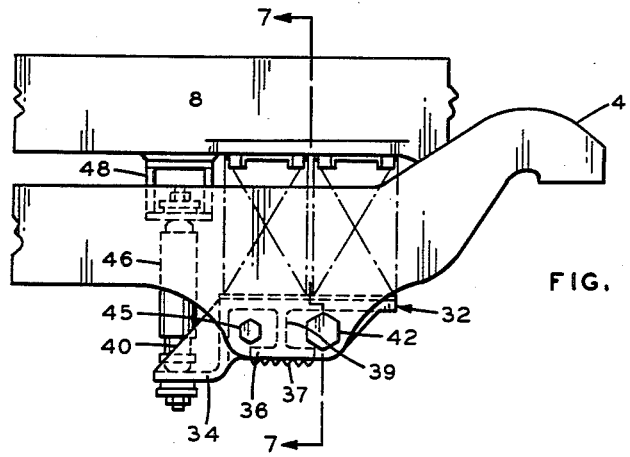
Figure 6 is a partial side view of a truck showing a modified spring seat structure.

The truck includes the usual wheels 1, axles 2 and journal boxes 3. The elevated end portions of longitudinally extending equalizers 4 rest on journal boxes 3, and the slightly depressed intermediate portions support coil springs 6, which resiliently support frame 7. Frame 7 is of the usual cast steel construction and consists of box section wheel pieces 8, including journal box receiving pedestal portions 9, and transverse transoms 10 and 11. The usual brake hanger brackets 12 are formed on the frame near the intersections of the wheel pieces and intermediate transoms 11, to provide a pivotal mounting for the brake hangers (not shown).

The equalizers 4 are arranged in transversely spaced pairs, one equalizer of each pair being outboard and the other inboard of the wheelpiece. Near each end of their depressed intermediate portions the equalizers are formed with depending projections 13, each of which includes a transverse vertical slot 14. A double spring seat consisting of a rectangular normally horizontal plate 18, depending side wall portions 19 vertically slotted intermediate their ends as at 20, and horizontal bottom web 21 is normally received between the equalizers 4 with slots 20 and 14 in registry. A gib or key 22 passes through the registering slots for holding the spring seat in place in the equalizers. The horizontal plate portion 18 of the spring seat is provided with six upstanding lugs including end pairs 23, and an intermediate pair 24, which are arranged to form a longitudinally arranged pair of shallow spring receiving substantially cylindrical cavities. Normally a pair of coil springs 6 are seated in the cavities formed on plate 18 so as to resiliently support frame 8. To prevent excessive tilting of the spring seat longitudinally of the truck, the end lugs 23 project transversely and vertically from plate 18 so as to engage the lower surface of the equalizers when any tilting of the seat occurs.

Gib 22 is formed with shoulders 28 at each end, the distance from the top of the gib to the bottom of the shoulders being nearly equal to the maximum vertical dimension of the registering slots, and the inner edges of the shoulders being spaced apart from each other a distance slightly greater than the outer surfaces of the equalizers. Normal pressure of the equalizer springs on the spring seat urges the gib downwardly so that its shoulders project below the bottom of the slots in the equalizers and undesired removal is thus prevented. For assisting in the removal of the spring seat the lower surface 30 of bottom web 21 is knurled or otherwise roughened to form a jacking pad.

Operation of the device is as follows:

With the elements in their normal operative position as indicated above, if it is desired to remove a spring, the frame is blocked at its normal height to prevent its settling on the top of the boxes; a jack J is then placed under the jacking pad 30 and raised until slots 20 and 14 are in substantially complete vertical registry with each other. Key 22 is grasped by hand and raised so that its shouldered end portions are in vertical registry with the slots, and it is then manually removed outwardly. The jack is then lowered and the spring and spring seat are removed. Replacement of the spring is accomplished by the same steps in reverse order.

Figure 7:
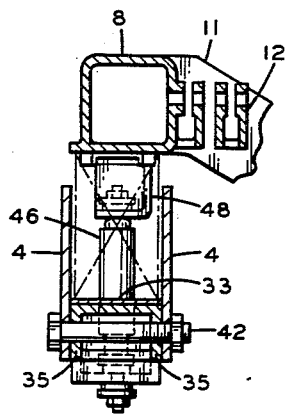
Figure 7 is a transverse vertical sectional view along the line 7—7 of Figure 6.
Figure 8:
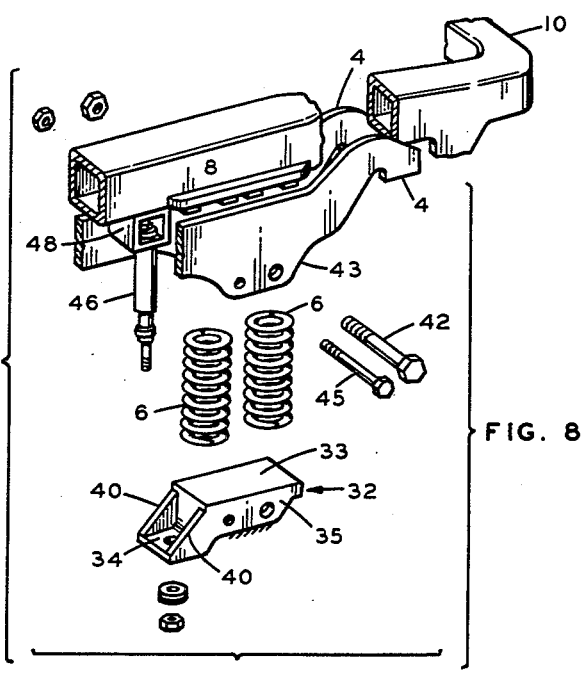
Figure 8 is an exploded perspective view of a portion of the truck illustrated in Figures 6 and 7.

In the second form of the invention, shown in Figures 6–8, the truck structure, except for the equalizers and equalizer spring seats is substantially as shown in Figure 1, and the same reference characters designate corresponding elements. The modified spring seat, generally indicated at 32, comprises a spring supporting horizontal plate 33, with a depending L-shaped snubber bracket 34 at one end, depending side wall portions 35, and horizontal bottom web 36, knurled on its lower surface as at 37 to form a jacking pad. A transverse vertical rib 39 connects the plate 33 and bottom web 36, and the opposite side walls 35. Side walls 35 are extended longitudinally as at 40 to provide additional rigidity to snubber bracket 34. It will be understood that the horizontal spring supporting plate 33 would be provided with upstanding cylindrical flanges or other conventional spring retaining members such as the bosses 23 and 24 in the first embodiment, for preventing the springs from sliding off the seat.

The spring seat is interposed between the equalizers with its side walls abutting the inside surfaces of the equalizers. The major part of the load is transferred from the spring seat into the equalizers through a bolt 42 which passes through registering openings in projections 43 depending from the equalizers and in the spring seat side walls 35. For restraining the spring seat against tilting about the bolt 42, a smaller bolt 45 passes through and is secured in similarly aligned openings in the equalizers and the spring seat side walls, the latter mentioned openings being spaced longitudinally of the spring seat from the first mentioned openings. The arrangement of the openings necessitates a somewhat wider equalizer projection 43 than the projections 13 shown in Figure 1.

A friction snubber 46 is secured in the usual manner at its lower end to bracket 34 and at its upper end to a bracket 48 mounted on the lower surface of wheel piece 8, so as to snub movements of coil springs 6. In this connection it will be noted that main supporting bolt 42 is not at the longitudinal center of the spring seat, but is slightly offset longitudinally in the direction opposite the snubber bracket 34; by means of this offset, although the major part of the load is transferred from the spring seat to the equalizers through supporting bolt 42, the smaller stabilizing bolt 45 is always loaded; thus even though the holes through which the bolts pass are of slightly greater diameter than the bolts to facilitate insertion and removal of the bolts, the seat will not oscillate about the main bolt responsive to the action of the snubber, with consequent wear on the bolts. Insertion and removal of the second form of seat are essentially similar to those operations with regard to the first form.

The details of the structure may be varied substantially without departing from the spirit of the invention and the exclusive use of those modifications coming within the scope of the appended claims is contemplated.

What is claimed is:

1. A railway truck including wheel and axle assemblies, equalizers at each side of the truck each comprising a pair of laterally spaced bars supported at their ends on said assemblies and extending longitudinally of the truck therebetween, spring seats adapted to be inserted between the bars of each of said equalizers from below, a single removable element extending transversely of the truck through said equalizers and each of said spring seats substantially mediate the ends thereof and supporting said spring seat from said equalizers, stabilizing structure carried by and spaced longitudinally of said seats from said element and vertically aligned with a horizontal surface of said equalizer bars whereby to limit tilting movements of said seats about said elements as axes, and means forming jacking pads on the bottom of said spring seats whereby said spring seats may be raised sufficiently to unload the removable elements and thus permit their removal, springs on each said spring seat, and a truck frame supported on said springs.

2. A railway truck according to claim 1 in which said removable elements are gibs having depending shoulders normally in abutting relation with vertical surfaces of said equalizers but adapted to register with openings in said equalizers when said spring seats are raised a predetermined distance from their normal position.

3. A railway truck according to claim 1, in which the equalizers are provided with depending projections intermediate said wheel and axle assemblies for receiving said removable elements whereby to permit the location of said spring seats at a low height relative to said equalizers.

4. A railway truck according to claim 1 in which said spring seats comprise a spring supporting top member of less width than the space between said equalizers, and the stabilizing structure includes lateral projections near each end of said top member engageable with a horizontal surface of said equalizers for restraining tilting of the equalizer about said removable elements.

5. In a railway truck, wheeled axles, a pair of equalizer bars spaced apart laterally of the truck and supported at their ends on each end portion of said axles and extending longitudinally of the truck therebetween, spring seats received between the bars of each pair and each having an upwardly-facing spring-receiving surface and a downwardly-facing jacking pad surface, a removable element extending transversely of the truck through said bars and each of said spring seats substantially mediate the ends of the spring-receiving surface thereof and supporting said spring seats from said bars, stabilizing structure carried by each of said seats and spaced longitudinally of the truck from said removable elements, said structure and said bars having opposing upwardly- and downwardly-facing surfaces whereby to limit tilting movements of said seats about said elements as axes, springs seated on the upper surfaces of said seats, and a truck frame supported on said springs.

6. A railway truck according to claim 5 in which a snubber is mounted between the truck frame and the spring seat, said spring seat having a snubber-mounting bracket at one end.

7. A railway truck according to claim 6, in which said stabilizing structure is a second removable element extending transversely through said spring seat between said first named removable element and said snubber-mounting bracket and said first-named removable element is off-centered longitudinally of said spring seat in a direction opposite said snubber-mounting bracket, whereby said second removable element is always loaded by the springs and oscillation of the spring seat about said first named element is prevented.

8. A railway truck according to claim 5 in which said stabilizing structure is a second removable element extending transversely through said equalizers and spring seat.

9. A spring seat adapted to be inserted between transversely spaced equalizers, comprising a horizontal spring-supporting plate portion having longitudinally spaced transversely extending projections disposed to engage the lower surfaces of the equalizers whereby to restrain tilting of the seat in its longitudinal vertical plane, structure depending from said horizontal plate portion, said depending structure being apertured transversely to receive an element for securing said seat between the equalizers, the bottom of said depending structure including a substantially horizontal surface portion.

10. A spring seat adapted to be inserted between transversely spaced equalizers, comprising a horizontal spring-supporting plate portion, means at one end of said plate portion engageable with a snubbing device, structure depending from said horizontal plate portion, said depending structure being twice apertured transversely, the first aperture being off-centered longitudinally of said horizontal plate in a direction opposite said snubber-engaging means, the second aperture being between the first aperture and the snubber-engaging means, the first aperture being adapted to receive an element securing said spring seat to the equalizers and transmitting the spring load into the equalizers, the second aperture being adapted to receive an element for restraining tilting of the spring seat about the first-named element, the bottom of said depending structure including a substantially horizontal surface portion.

11. A spring seat adapted to be inserted between transversely spaced equalizers, comprising a horizontal spring supporting plate portion, structure depending from said horizontal plate portion, said depending structure being twice apertured transversely, the first aperture being substantially mediate the ends of the spring seat, the second aperture being between the first aperture and an end of the spring seat, the first aperture being adapted to receive an element securing said spring seat to the equalizers and transmitting the spring load into the equalizers, the second aperture being adapted to receive an element for restraining tilting of the spring seat about the first-named element, the bottom of said depending structure including a substantially horizontal downwardly facing portion.

References Cited in the file of this patent

UNITED STATES PATENTS

| | | |
|---|---|---|
| 872,016 | Price | Nov. 26, 1907 |
| 1,022,922 | Austin | Apr. 9, 1912 |
| 1,023,019 | Hobson | Apr. 9, 1912 |